(12) United States Patent
Atago et al.

(10) Patent No.: US 6,286,478 B1
(45) Date of Patent: Sep. 11, 2001

(54) CONTROL DEVICE FOR ENGINE PROVIDED WITH ELECTROMAGNETIC DRIVEN INTAKE VALVES AND COMPUTER USEABLE MEDIUM HAVING COMPUTER READABLE PROGRAM CODE FOR PERFORMING THE CONTROL

(75) Inventors: Takeshi Atago; Toshio Hori; Shigeyuki Nonomura, all of Hitachinaka (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/385,373

(22) Filed: Aug. 30, 1999

(30) Foreign Application Priority Data

Aug. 28, 1998 (JP) .................................. 10-243640

(51) Int. Cl.⁷ .............................. F02D 41/00; F01L 9/04
(52) U.S. Cl. ........................................ 123/306; 123/90.11
(58) Field of Search ........................... 123/90.11, 90.15, 123/306, 308, 478

(56) References Cited

U.S. PATENT DOCUMENTS

| | | | |
|---|---|---|---|
| 4,945,870 | * 8/1990 | Richeson | 123/90.11 |
| 5,115,782 | * 5/1992 | Klinke et al. | 123/308 X |
| 5,669,341 | * 9/1997 | Ushirono et al. | 123/90.11 |
| 5,765,514 | * 6/1998 | Sono et al. | 123/90.11 |
| 5,765,528 | * 6/1998 | Kamimaru | 123/90.11 X |
| 6,192,857 | * 2/2001 | Shimada | 123/90.11 X |

FOREIGN PATENT DOCUMENTS

| | | |
|---|---|---|
| 63-147957 | 6/1988 | (JP) . |
| 3-74547 | 3/1991 | (JP) . |
| 9-88645 | 3/1997 | (JP) . |
| 10-82333 | 3/1998 | (JP) . |

* cited by examiner

Primary Examiner—Tony M. Argenbright
(74) Attorney, Agent, or Firm—Crowell & Moring LLP

(57) ABSTRACT

A control device employing a computer readable program code, for an engine is provided with an electromagnetic actuator controlling opening and closing operation of an intake valve in response to an electric driving signal. The device determines a target A/F based on a signal corresponding to a requested engine output value and a signal representing a driving condition of the engine, determines a requested intake air flow of a cylinder of the engine based on the signal representing a driving condition of the engine and the target A/F, and determines control values for opening and closing operation of an intake valve based on the requested intake air flow and the target A/F. The control values include at least one of a valve opening timing, a valve opening time and a maximum valve lifting amount of the intake valve. Electric driving signals are generated according to the control values.

12 Claims, 14 Drawing Sheets

MAXIMUM VALVE LIFT

SWIRL

TUMBLE

CONTROL DEVICE FOR ENGINE PROVIDED WITH ELECTROMAGNETIC DRIVEN INTAKE VALVES AND COMPUTER USEABLE MEDIUM HAVING COMPUTER READABLE PROGRAM CODE FOR PERFORMING THE CONTROL

CROSS-REFERENCE TO RELATED APPLICATIONS

The present application relates to subject matter described in copending application Serial No. 09/335767, titled "Control Device for Engine Provided With Electromagnetic driven Intake Valves" filed on Jun. 18, 1999 by Toshio Hori and commonly assigned to Hitachi, Ltd. The disclosures of this application are incorporated herein by reference.

BACKGROUND OF THE INVENTION

The present invention relates to a control device for an engine provided with electromagnetic driven intake valves and more particularly to the control device for an engine provided with electromagnetic driven intake valves that is constructed to control a super lean burn by operating a valve opening and closing timing of the electromagnetic driven intake valve and the control method therefor.

The Official Gazette of JP-A-63-147957 discloses a technique of achieving an engine brake effect and reducing torque shock and pumping loss by changing an opening and closing timing of electromagnetic driven valves. The technique disclosed in this Official Gazette is constructed to set the valve timing of an intake valve to a normal timing during a fuel cut period in a decelerating time and change the valve timing into a early closing timing immediately before the end of the fuel cut (restart of the fuel supply). Since the valve opening and closing timings are alternately changed between the two timing modes, that is, the normal timing and the early closing timing, the early closing timing constantly set during the fuel cut period may disadvantageously causes the pumping loss to be too much reduced, thereby making the engine brakes effect insufficient.

The JP-A-9-88645 has proposed a technique that is constructed to overcome the foregoing disadvantage. This technique uses electromagnetic driven intake valves for more fine adjusting a valve opening period in a predetermined fuel-cut driving condition, thereby reducing the pumping loss and achieving a proper engine brake effect. The technique disclosed in JP-A-9-88645 has proposed the reduction of the torque shock and pumping loss in the fuel-cut driving condition or the like by changing the opening and closing timing of the electromagnetic driven valve, concretely, an opening timing of the valve. However, the technique has no special proposal on a lean burn engines and a system for controlling the lean burn engines for improving combustion efficiency of the engine.

In the current field of engines for automobiles, it is more expected to reduce the fuel consumption. Hence, various techniques have been proposed for controlling an A/F (air-fuel ratio) of an engine so that the engine may adopt a lean burn method. As a technique of relating the A/F control to intake and exhaust valves, the JP-A-10-82333 discloses a technique provided with a valve timing varying device for varying an opening and closing timing of at least one of the intake and the exhaust valves according to the A/F. The JP-A-3-74547 also proposes a technique for changing a fresh air rate according to change of the valve timing. This technique is constructed to correct a fuel supply by changing an engine A/F according to the opening and closing timing of the intake and the exhaust valves.

On the other hand, in order to adjust an engine A/F, it is necessary to adjust the opening and closing time of the intake and the exhaust valves according to some factors such as an engine speed and load. Also, in order to improve a combustion state for giving an influence on an engine output, it is necessary to adjust an intake speed of air flowing into a cylinder, that is, the influence caused by swirl or tumble of suction air generated in the cylinder.

However, though the technique disclosed in JP-A-3-74547 is constructed to relate the A/F control with the intake and the exhaust valves, the technique does not consider the swirl generated inside of the cylinder. Moreover, it does not take into consideration the relation between the action of the intake and the exhaust valves and the swirl when controlling the A/F.

It is an object of the present invention to a control device for an engine provided with electromagnetic driven valves which is constructed to adjust intake air sucked into the cylinder of the engine and a sucking speed by controlling an opening and closing timing, a valve opening time, and a lifting amount in the valve opening and thereby to stabilize a super lean burn in the engine for controlling an A/F, and a control method for the engine.

SUMMARY OF THE INVENTION

According to an aspect of the invention, a control device for an engine provided with an electromagnetic actuator for controlling an opening and closing operation of an intake valve according to an electric driving signal includes means for determining a target A/F based on a signal corresponding to a requested engine output and a signal for representing a driving condition of the engine; means for determining a requested intake air amount of a cylinder of the engine based on the signal for representing the driving condition of the engine and the target A/F; and control means for determining control values about an opening and closing operation of the intake valve based on the requested intake air amount, the control values including at least one of a valve opening timing, a valve opening time and a maximum valve lifting amount, and the target A/F and generating an electric driving signal according to the determined control value.

According to another aspect of the invention, a computer usable medium having computer readable program code means embodied in said medium for a control method for an engine provided an electromagnetic actuator for controlling an opening and closing operation of an intake valve according to an electric driving signal, said computer readable program code means comprising:

a process of determining a target A/F based on a signal corresponding to a requested engine output and a signal for representing a driving condition of the engine, a process of determining a requested intake air amount of a cylinder of the engine based on the signal for representing the driving condition of the engine and the target A/F, and a process of determining control values about an opening and closing operation of the intake valve based on the requested intake air amount and the target A/F, the control values including at least one of a valve opening timing of the intake valve, a valve opening time and a maximum valve lifting amount, and generating the electric driving signal according to the determined control value.

Further, according to another aspect of the invention, a control device for an engine provided with electromagnetic driven intake and exhaust valves is characterized to have such a structure as circulating the air flown into an engine cylinder in a swirling and/or tumbling manner and means for calculating a valve opening timing, a valve opening time and a lifting amount, said means serving to set the valve opening and/or the valve closing timing of the intake valve and/or calculate the lifting amount of the valve opening, control the air amount sucked into the engine cylinder, and control the strength of the air whirl such as swirl and/or tumble.

According to another aspect of the invention, the control device is characterized to provide means for controlling an ignition timing, said ignition timing control means serving to correct an ignition timing according to the strength of the air whirl such as swirl and/or tumble of the air flown into the engine cylinder and correct the ignition timing according to the flow of the air flown into the engine cylinder.

According to another aspect of the invention, the strength of the air whirl such as swirl and/or tumble of the air flown into the engine cylinder is determined on the basis of the requested torque of the engine that is one of the driving conditions of the engine so that the air flown into the engine cylinder may be determined.

The control device for an engine provided with electromagnetic driven intake and exhaust valves constructed as mentioned above provides the intake valves for properly controlling the opening and the closing through the effect of an electromagnetic action and variably controlling the lifting stroke of the valve opening. Further, the control device operates to calculate a valve opening and closing timing, a valve opening time and a lifting amount of the valve opening of the intake valve based on the target A/F and the requested intake air amount calculated on the driving condition of the engine such as an accelerator operating amount, properly adjusting the intake air amount flown into the engine cylinder and the strength of the air whirl such as swirl and tumble by operating the intake valve, thereby making it possible to stabilize the combustion even in the super lean burn through the effect of the A/F control of the engine.

DESCRIPTION OF THE EMBODIMENTS

Hereafter, the description will be oriented to a control device for an engine provided with electromagnetic driven intake valves according to the invention along the appended drawings.

Figure 1:
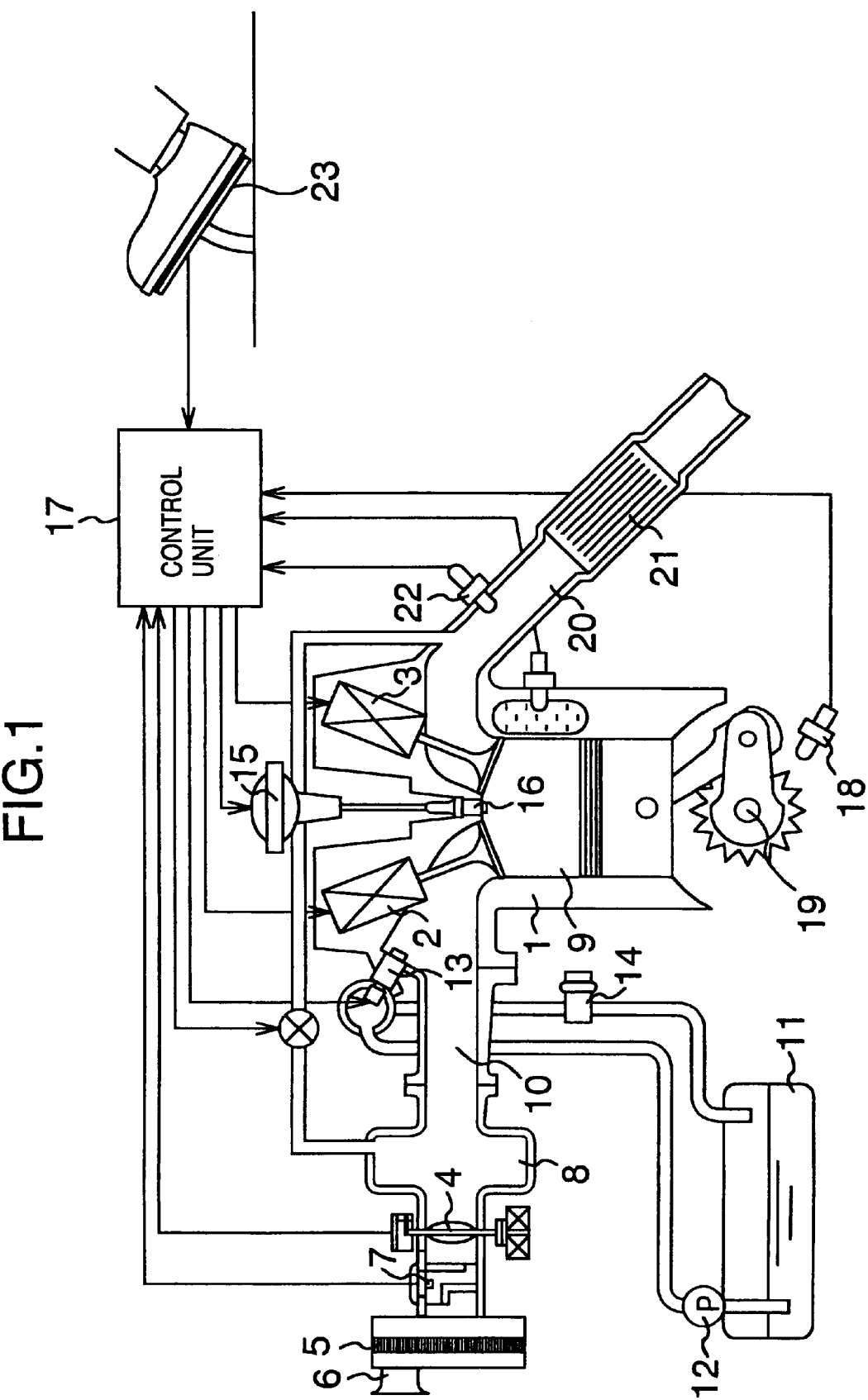
FIG. 1 is an overall view showing an engine system that is an embodiment of a control device for an engine provided with electromagnetic driven intake and exhaust valves according to the present invention.

FIG. 1 shows an overall construction of a port injection engine system provided with the electromagnetic driven intake and exhaust valves that characterize the present embodiment. The electromagnetic driven valves include an intake valve 2 and an exhaust valve 3. An air flow sucked into an engine 1 is controlled according to the opening and closing amount of the intake valve 2. A numeral 4 denotes an electric controlled throttle valve (ETC) 4 which is located for assisting in controlling the intake air.

In FIG. 1, the air to be sucked into the engine 1 is taken from an inlet 6 of an air cleaner 5. Then, the air passes through an air-flow meter served as measuring intake air flow Qa and then enters into a collector 8. The air sucked into the collector 8 is distributed into intake tubes 10 each of which is connected to the corresponding cylinder 9 of the engine and then is guided into a combustion chamber of the cylinder 9.

On the other hand, fuel such as gasoline is sucked from a fuel tank 11 and pressurized by a fuel pump 12 and then is supplied to a fuel system having an injector 13 located therein. The pressure of the pressurized fuel is regulated into a constant pressure (for example, 3 kg/cm$^2$) through the effect of a fuel pressure regulator 14 and then is injected from an injector 13 provided in the cylinder 9 to the inside of an intake tube 10. The injected fuel is ignited by an ignition plug 16 with an ignition signal having high voltage generated by an ignition coil 15.

A numeral 17 denotes a control unit that is inputted with a signal for indicating an intake air flow from the air-flow meter 7, an angular signal POS of a crank shaft 19 sent from a crank angle sensor 18, and a component detection signal of exhaust gas sent from an A/F (air/fuel ratio) sensor 22 located before a catalytic converter 21 disposed in the exhaust tube 20.

The intake air flow signal detected by the air-flow meter 7 is filtered and converted into an air flow value. The derived intake air flow value is divided by an engine speed and then is multiplied by a coefficient k thereby to make an A/F a stoichiometric value (A/F=14.7). The resulting value is a width of a basic fuel injection pulse for one cylinder, that is, a basic fuel injection. Then, the fuel is corrected according to a driving condition of an engine based on the basic fuel injection. Next, the injector is driven so that the fuel is supplied to each cylinder.

Further, the actual A/F of the mixture can be detected from the output of the A/F sensor 22 located in the exhaust tube 20. Hence, a desired A/F can be obtained by performing a closed loop control for adjusting a supply fuel amount in response to the signal of the A/F sensor.

Figure 2:
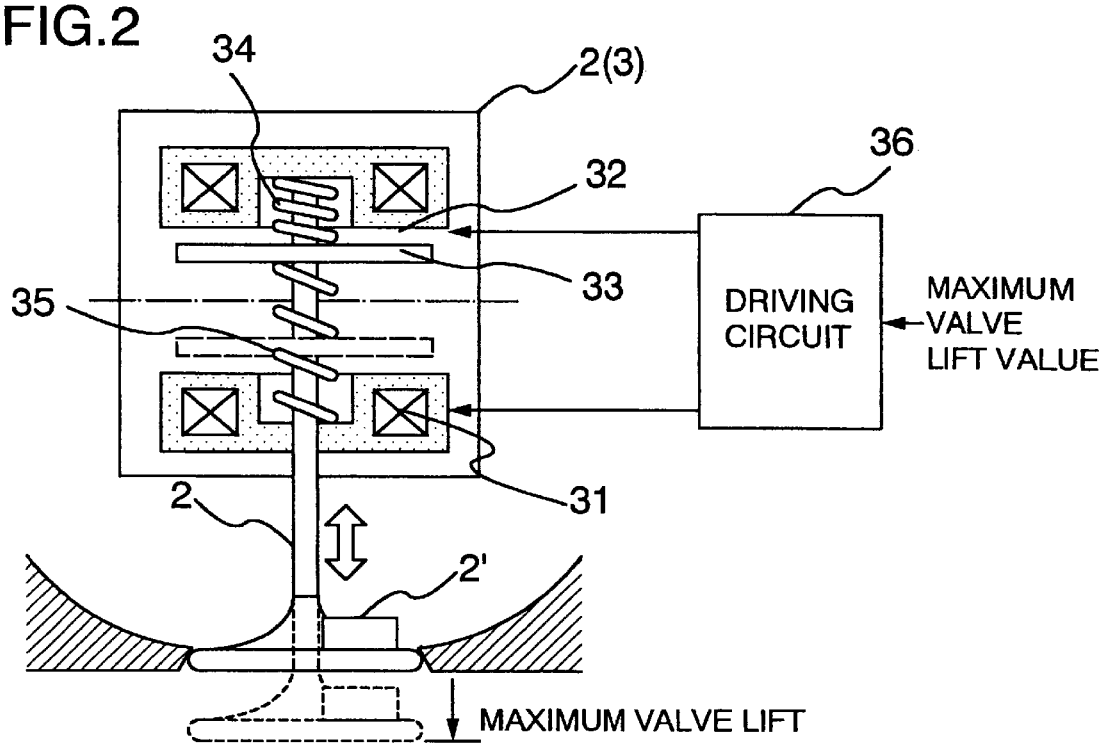
FIG. 2 is a longitudinal section showing an overall construction of one of the electromagnetic driven intake valves shown in FIG. 1.

FIG. 2 shows a concrete construction of the intake valve 2 shown in FIG. 1. In FIG. 2, a real line indicates a valve-closed state, while a dotted line indicates a full-open state of the valve. When the valve is closed, a driving circuit 36 is served to supply current to an electromagnetic coil 32. When the valve is opened, the driving circuit 36 is served to supply current to an electromagnetic coil 31. Further, a movable member 33 is also provided for receiving forces of two coil springs 34 and 35. The member 33 is attracted by the activated electromagnetic coil 31 or 32. When the engine 1 is stopped, neither the electromagnetic coils 31 and 32 are driven. Hence, the member 33 is located in a middle lifting position indicated by an alternate long and short dash line of FIG. 2. When the valve is opened, the electromagnetic coil 31 is driven so that the member 33 is shifted into the maximum lifting position. When the valve is closed, the electromagnetic coil 32 is driven so that the member 33 is shifted into a full-closed position. The maximum valve lifting amount can be varied by adjusting the current supplied into the coils 31 and 32.

Figure 3A:
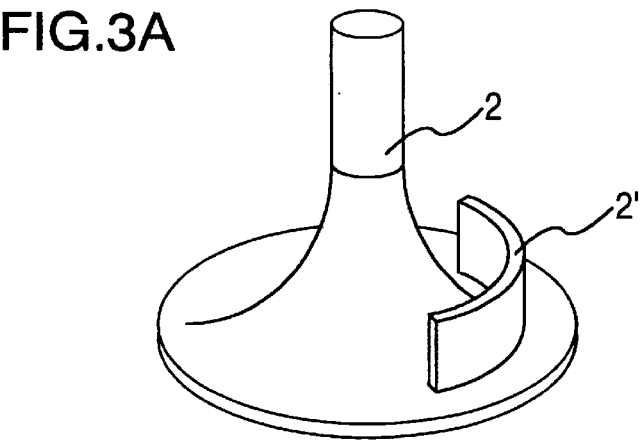
FIG. 3A is a perspective view showing a valve body of the electromagnetic driven intake valve shown in FIG. 2.
Figure 3B:
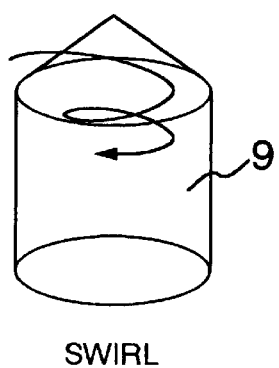
FIG. 3B is a view showing a swirl flow in a cylinder.
Figure 3C:
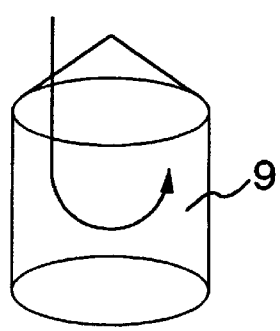
FIG. 3C is a view showing a tumble flow in the cylinder.

FIG. 3A shows an example of the intake valve 2 applied to this embodiment. A shroud 2' is located on the intake valve 2 in the side of intake tube. A part of air flow is changed in the direction of flow by the shroud 2', thereby generating a whirl flow such as swirl or tumble. The swirl (see FIG. 3B) or the tumble (see FIG. 3C) is varied in direction and strength according to the location and the form of the shroud 2'. In place of the shroud, a special valve or plate may be located in an intake port for the purpose of generating the swirl or the tumble.

Figure 4:
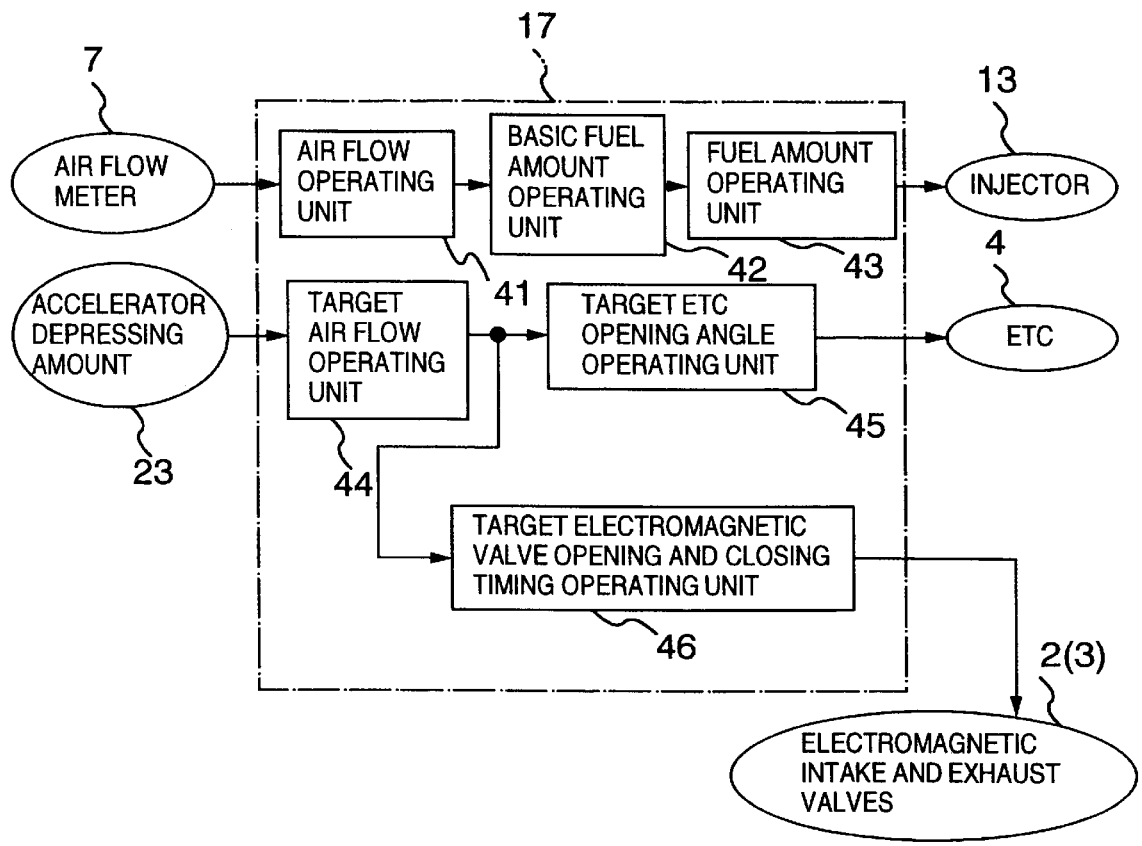
FIG. 4 is a block diagram showing an operation of the engine control device shown in FIG. 1.

FIG. 4 is a basic control block diagram showing a control unit 17 for controlling the injector 13, the electronic controlled throttle valve 4, and the electromagnetic intake and exhaust valves 2 and 3. all of which are contained in the control unit 17 itself of the engine according to this embodiment. The control unit 17 is implemented by a microcomputer having a CPU, a memory for storing a control program and control data, and an I/O unit for controlling transfer of data between the CPU and the outside, all of which are conventional hardware and not shown. The control program may be recorded on a medium to be read by a computer such as a semiconductor memory, an optical disk, a magnetic disk or other types of memory devices.

The control unit 17 operates to control fuel to be injected and air flow to be sucked. The fuel to be injected is controlled as follows. The intake air flow to be sucked is derived by an air flow operating unit 41 based on an output signal from the air-flow meter 7. Based on the intake air flow, the fuel amount to be injected is derived by a basic fuel amount operating unit 41 and a fuel amount (correction) operating unit 43 and then supplied to an injector.

On the other hand, the electromagnetic driven intake valve 2 and the ETC 4 are served to control the air flow to be sucked into the engine 1. A target air flow operating unit 4 operates to determine a target air flow to be requested on a signal corresponding to a driver's depressing amount of an accelerator pedal, determine a target A/F on the engine torque value, and operating a requested target air flow according to the target A/F. Then, a target ETC opening angle operating unit 45 serves to operate a target ETC opening angle from the target air flow. Based on the target air flow, a target electromagnetic valve opening and closing timing operating unit 46 serves to operate the opening and closing timing of the electromagnetic intake valve required for achieving the target air flow. The target air flow can be obtained by driving the ETC 14 and the electromagnetic driven intake valve 2 according to the target values of the ETC and the electromagnetic driven intake valves operated as described above. By supplying the corresponding fuel to the intake air flow, therefore, the engine may be driven to supply an output according to the driver's intention.

Figure 5:
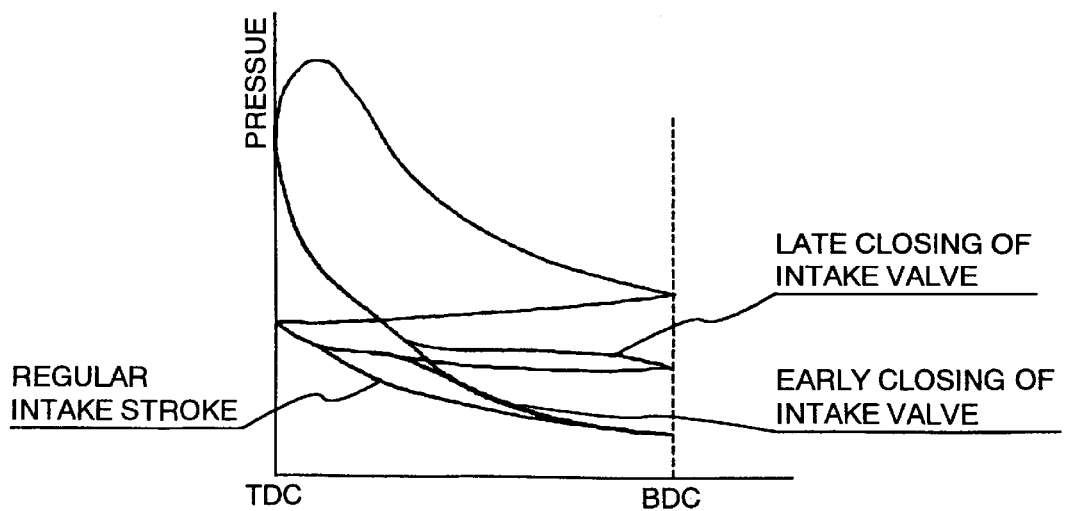
FIG. 5 is a graph showing relation between a pressure inside of a cylinder chamber and a stroke in the operation of the intake valve of the engine.

FIG. 5 shows relation between an engine stroke and a cylinder inner pressure appearing when the electromagnetic driven intake valve 2 is driven. The pressure inside of the cylinder in the intake stroke is changed according to the early closing or the late closing of the intake valve 2. The pressure is raised in the later closing of the valve 2.

Figure 6:
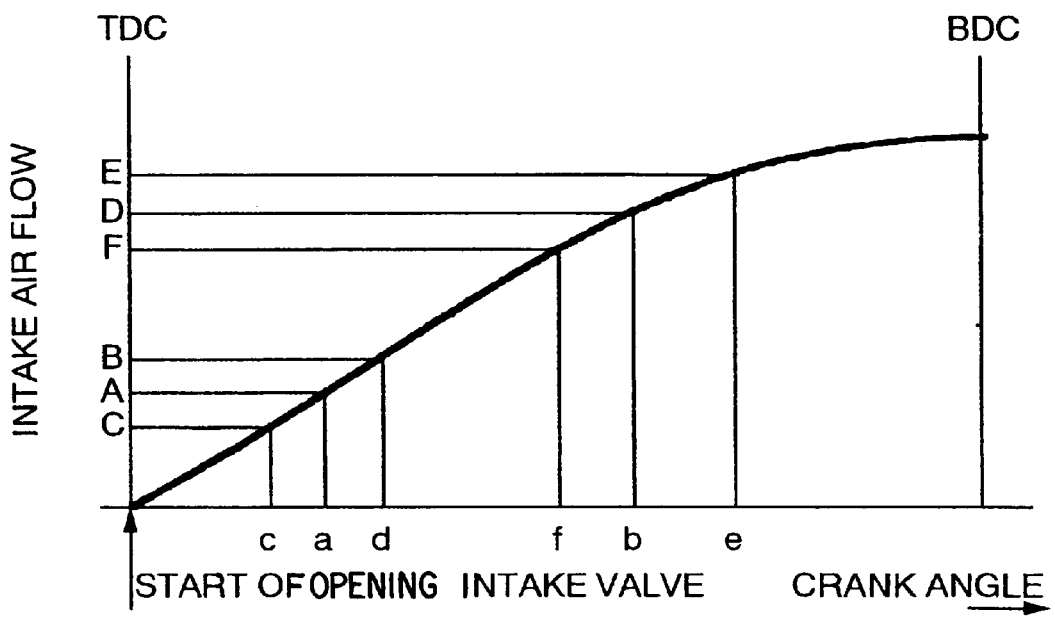
FIG. 6 is a graph showing relation between intake air amount flown into the cylinder and a crank angle in the operation of the intake valve of the engine.

FIG. 6 shows a general characteristic of an intake air flow of the engine against a crank angle thereof.

Figure 7:
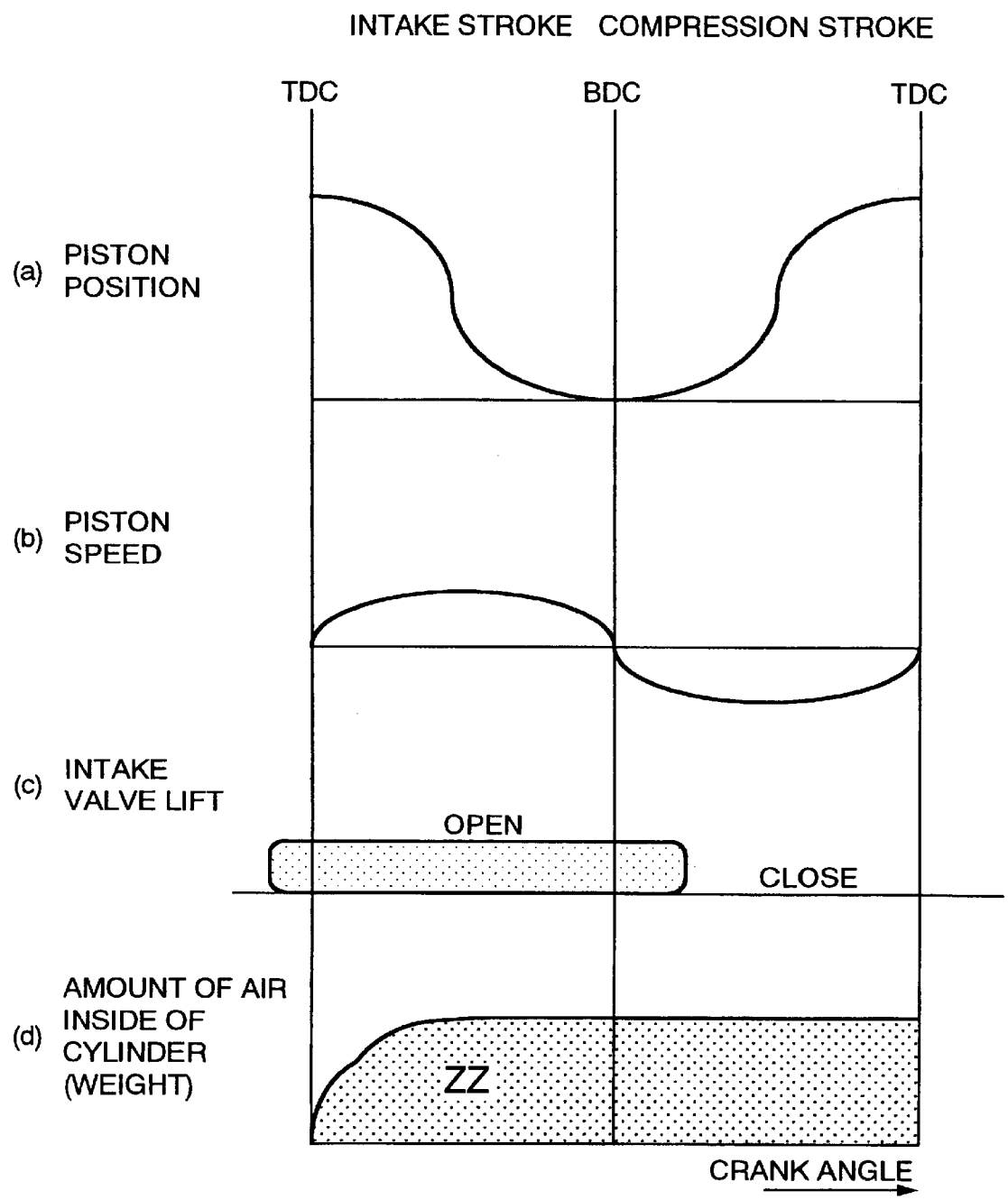
FIG. 7 is a chart showing a regular operating characteristic of intake valve.
Figure 8:
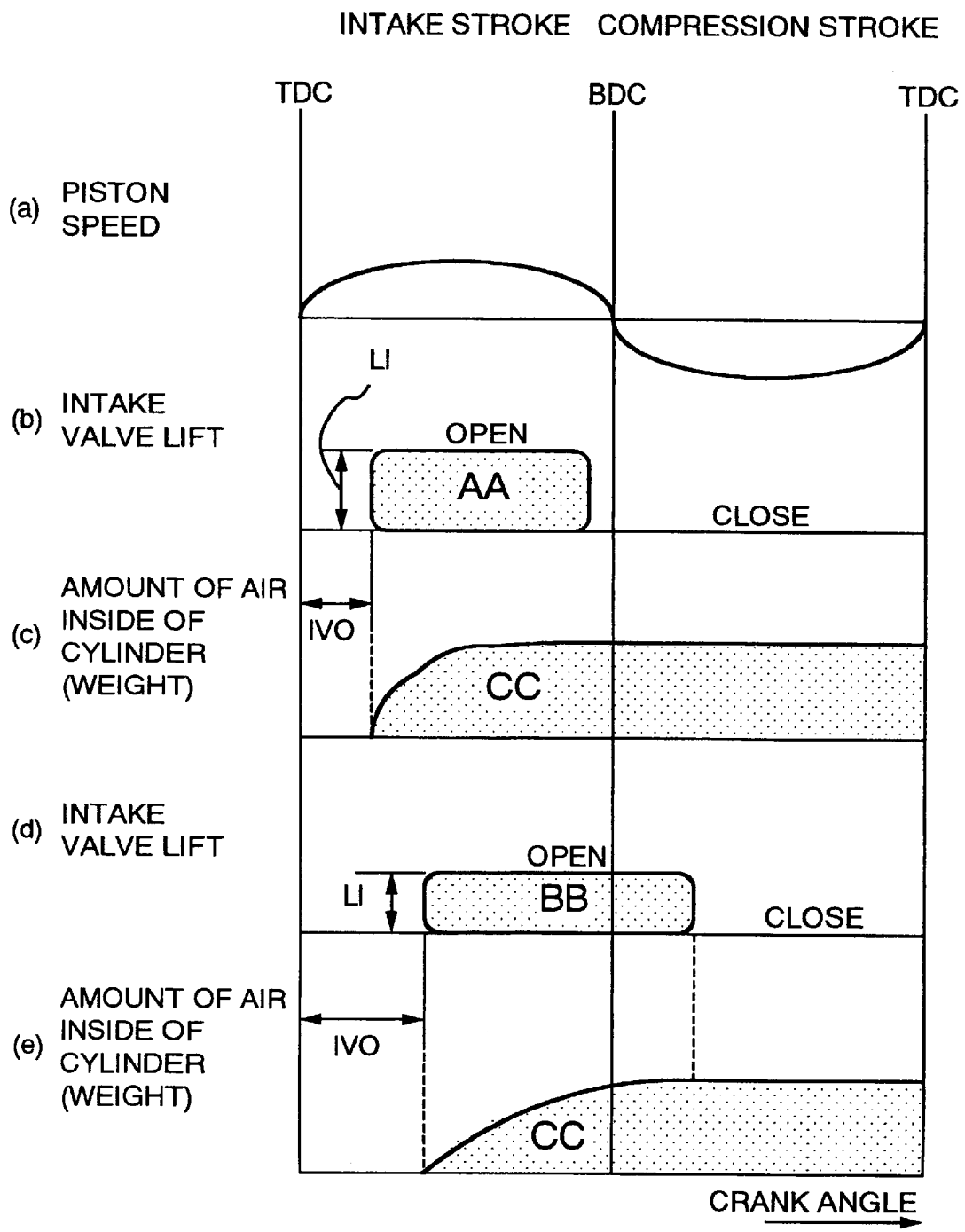
FIG. 8 is a chart showing an operating characteristic of the embodiment of the electromagnetic driven intake valve shown in FIG. 1.
Figure 9:
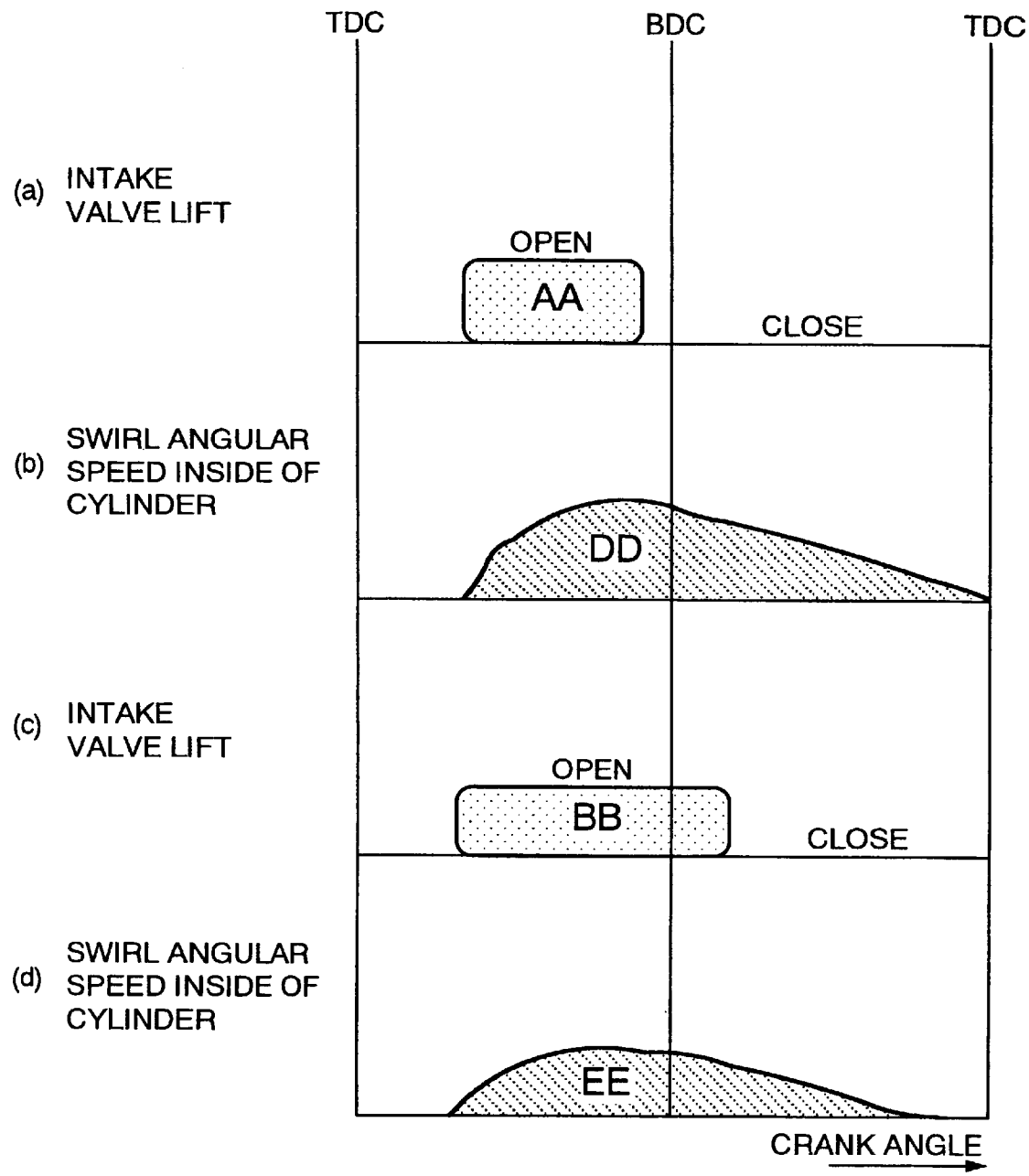
FIG. 9 is a chart showing an operating characteristic of another embodiment of the electromagnetic driven intake valve shown in FIG. 1.

FIGS. 7 to 9 show relation among a piston speed, an intake valve lift and an air flow (weight) inside of the cylinder. In general, as shown in FIG. 7, an axis of abscissas indicates a rotation phase of a crank shaft ranging an intake TDC (Top Dead Center) to a compression TDC. Assuming that an upper axis of ordinates (b) indicates a piston speed and a lower axis of ordinates (d) indicates an amount of air inside of the cylinder when the intake valve is opened and the exhaust valve is closed (For simplifying the description, the change of the air flow inside of the cylinder caused by the air inertia is ignored.), the piston is moved from the intake TDC in the lower direction of FIG. 1, so that the corresponding air to the volume of the movement of the piston is flown into the cylinder. Hence, the intake air flow is represented as an integration of the piston speed as shown in (d) of FIG. 7. Between the intake BDC (Bottom Dead Center) and the compression TDC, the intake valve and the exhaust valve are both closed, so that the amount of air (weight) inside of the cylinder is not changed.

FIG. 7 is shown for describing the characteristic of the intake valve on the regular opening and closing timing. In one intake stroke of the engine, the intake valve is lifted to a normal position on the normal timing against the position and the speed of the piston. Concretely, the intake valve is opened a bit before the TDC and closed a bit after the BDC. In this case, the air amount (weight) in the cylinder reaches a value indicated by ZZ shown in (d) of FIG. 7. Though not shown in FIG. 7, the strength of the air circulation (swirl or tumble) inside of the cylinder is let to run a natural course.

In turn, FIG. 8 shows an air flow to be sucked into the cylinder in the case of changing the valve opening and closing timing and the valve lift of the intake valve of this embodiment. The intake valve lift and the valve opening timing (IVO) are set as shown by AA of (b) FIG. 8 so that the timing is lagged behind the normal valve opening timing shown in (c) of FIG. 7. If the lift L1 is set as a regular value, the air flow to be sucked into the cylinder is made to be a value indicated by CC of (c) in FIG. 8. This air flow is somewhat smaller than the normal air flow shown in (d) of FIG. 7. On the other hand, (d) and (e) of FIG. 8 show another combination for setting the intake air flow CC to the same value. As shown by the lift BB, in place of lagging the intake timing IVO of the intake valve 2 behind AA of (b) in FIG. 8, the lift L1 is made smaller and the valve opening time is made longer. The performance achieved by this valve opening method will be described with reference to FIG. 9. The movements AA and BB of the intake valve shown in FIG. 9 are the same as those shown in FIG. 8. Herein, focusing on a swirl angle speed inside of the cylinder in the operation of FIG. 9, the intake air flow is the same as FIG. 8, and the swirl angle speed inside of the cylinder may be controlled to be a swirl number closer to a target value according to the operating way of the intake valve as indicated by DD and EE.

The swirl angle speed is a rotation (swirl) angle per unit time given when the air inside of the cylinder is swirled, that is, an angular speed of the swirl. The similar angular speed may be defined for the tumble flow. As the air flow speed is made faster when the air passes through the intake valve and enters into the cylinder, the swirl angle speed (tumble angle speed) has a larger value. The air flow speed is in proportional to the piston speed. Hence, in the intake stroke, the characteristic is as shown in the left half of (b) or (d) in FIG. 9. In the compression stroke, the swirl (tumble) is gradually being broken and finally changed into fine air turbulence. The characteristic is as shown in the right half of (b) or (d) in FIG. 9. For many cases, as the accumulated swirl number is made larger, the combustion is made more stable as will be described with reference to FIG. 11. The accumulated swirl number corresponds to a value given by integrating the swirl angle speed in the stroke between the TDC and the next TDC. For the accumulated tumble number, it is similarly defined. The accumulated swirl number or the accumulated tumble number may be used as a parameter for representing the strength of the swirl flow of the intake air.

In turn, the description will be oriented to the relation among several factors about combustion of the engine such as a combustion stability, an A/F, a swirl number, an engine load, an output torque, an engine speed, an engine intake air, a valve opening period of the intake valve, and a valve opening timing.

Figure 10:
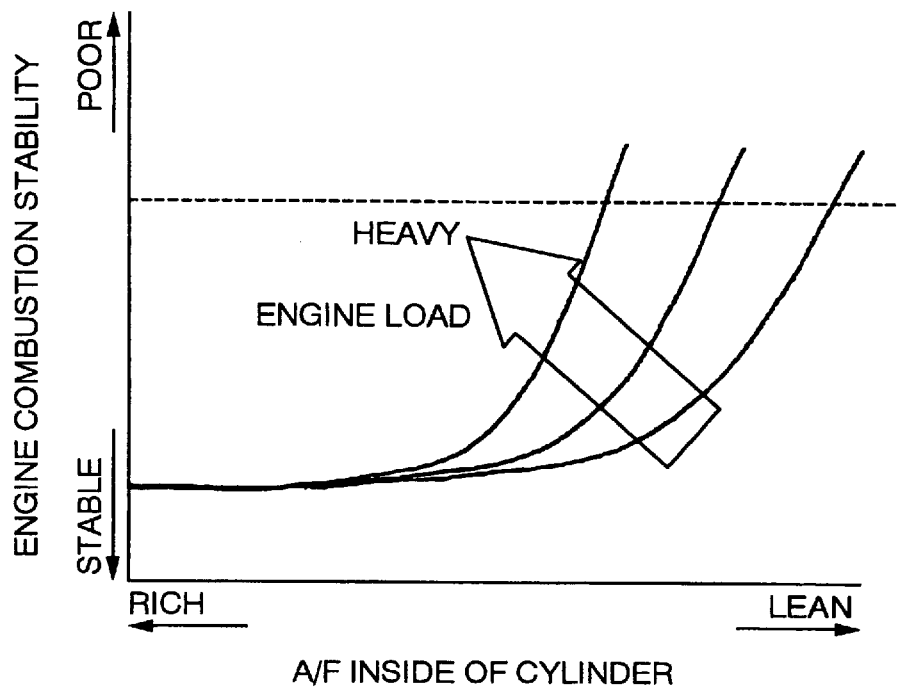
FIG. 10 is a chart showing characteristic curves of an A/F in a cylinder versus an engine combustion stability in different engine load values.
Figure 11:
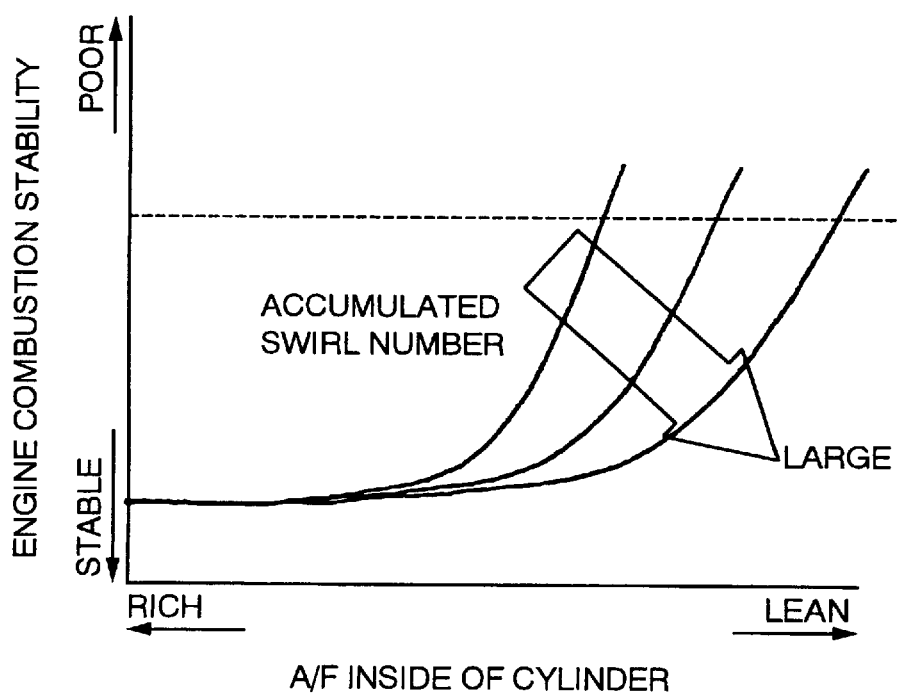
FIG. 11 is a chart showing a characteristic curves of an A/F in an engine cylinder versus an engine combustion stability in different swirl numbers.

FIGS. 10 and 11 show relation between the A/F of the engine (A/F inside of the cylinder) and the combustion stability (factor for indicating the stability of the engine speed). As shown in FIG. 10, in general, at the same A/F, with increase of the engine load, the combustion stability is made worse. As shown in FIG. 11, with increase of the accumulated swirl number, the combustion stability is made higher. In general, by properly selecting the accumulated swirl number (or accumulated swirl number) (normally making it greater), the combustion is improved. That is, by changing the opening and closing condition of the intake valve of the engine, the accumulated swirl number may be changed. Hence, the combustion stability may be secured according to the requested A/F of the engine.

FIGS. 12 to 15 show relation among the factors about the engine combustion from a view point of an operating factors actually set in the engine control unit for the purpose of properly controlling the engine.

Figure 12:
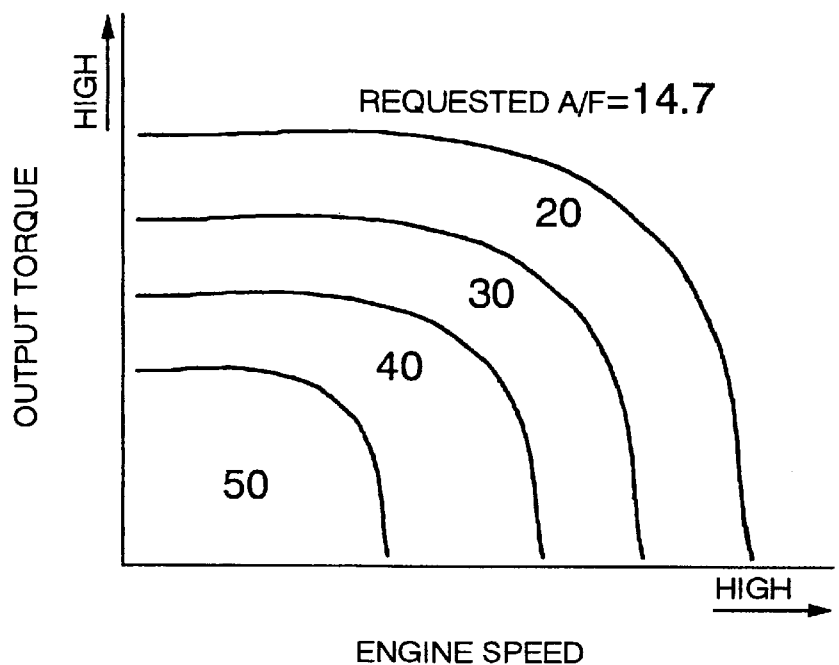
FIG. 12 is a chart showing a characteristic of a requested A/F versus an engine output torque and an engine speed.

FIG. 12 shows relation between an engine A/F and an engine speed and an output torque of the engine that is an example of a condition for setting an A/F of the mixture. Herein, the A/F is set from 14.7 to 50 at maximum at each load. The conventional technology has difficulty in stable combustion at the A/F of 50. In this embodiment, the stable combustion is made possible in A/F=50 by controlling the opening and closing of the intake valve so as to obtain the proper accumulated swirl number.

Figure 13:
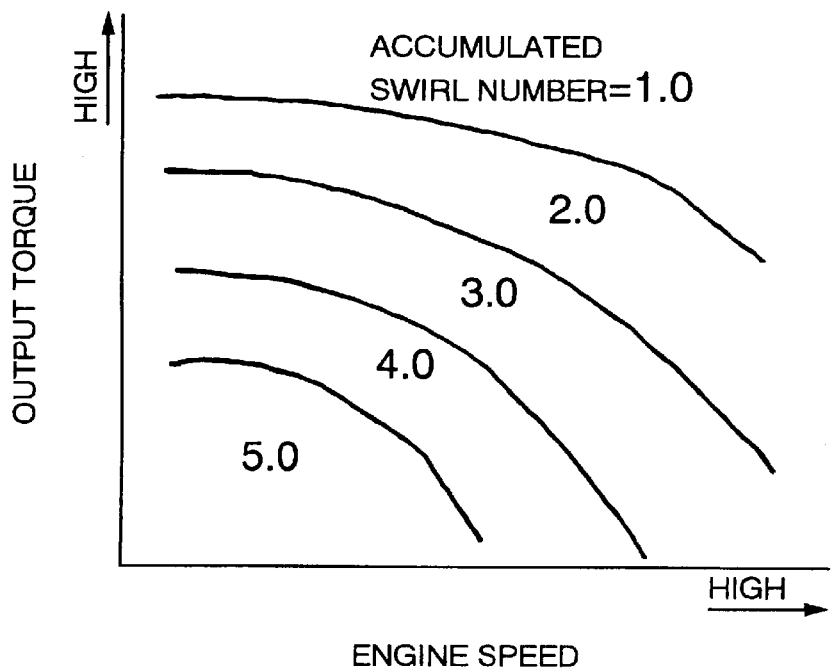
FIG. 13 is a chart showing a swirl number characteristic versus an engine output torque and an engine speed.

FIG. 13 shows relation between the accumulated swirl number and the engine speed and the engine output torque. As the first means for keeping the engine stably combusted at the A/F, the requested swirl number is indicated. FIG. 13 shows the accumulated swirl number as a representative example. In place, however, the accumulated tumble number or both the accumulated swirl number and the accumulated tumble number may be used.

Figure 14:
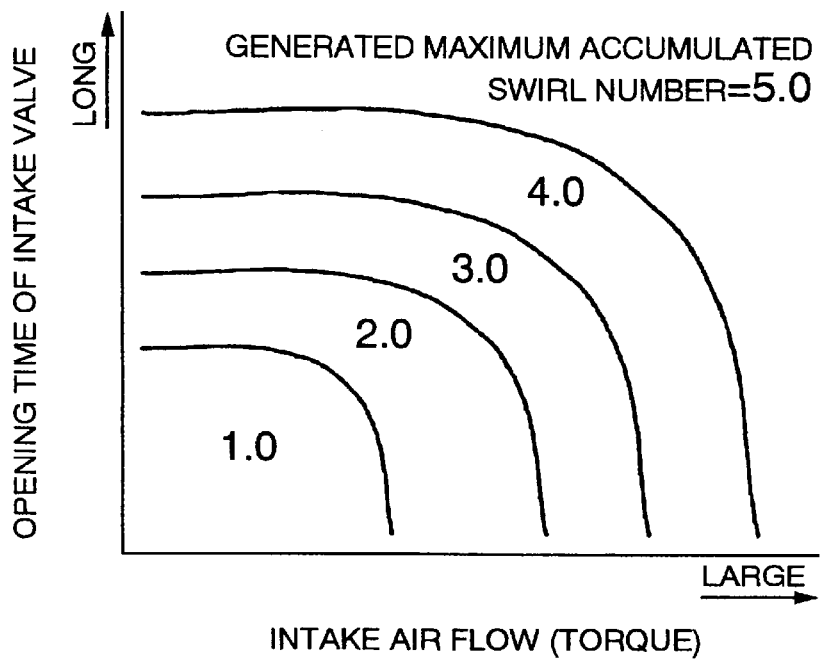
FIG. 14 is a chart showing a generated maximum swirl number characteristic versus an intake valve opening time and an engine intake air flow.
Figure 15:
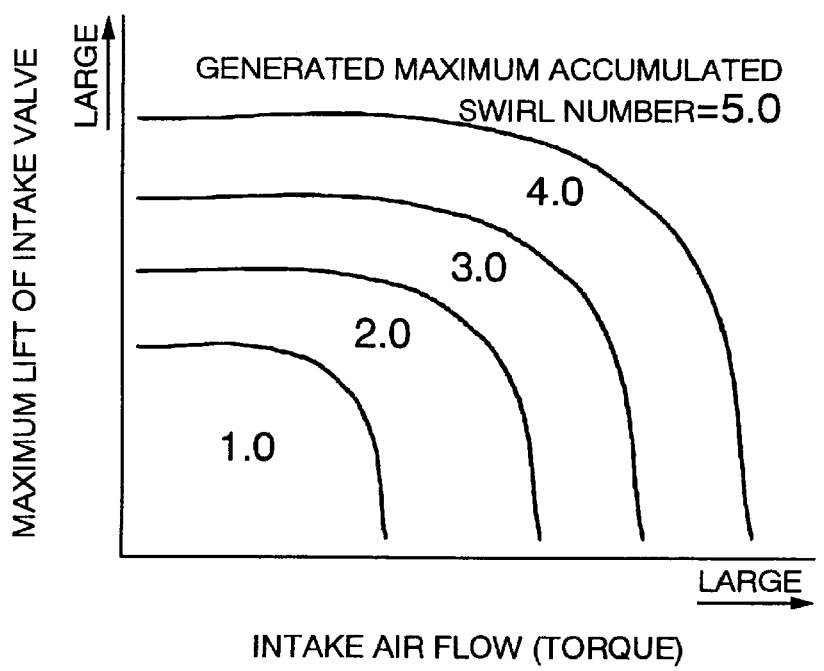
FIG. 15 is a chart showing a generated maximum swirl number characteristic versus an intake valve lift and an engine intake air flow.

FIGS. 14 and 15 show the maximum accumulated swirl number to be currently generated in the engine by opening and closing the intake valve. FIG. 14 shows the measured result based on the engine intake air and the valve opening time (period) of the intake valve 2 (at the constant IVO), while FIG. 15 shows the measured result of the generated maximum accumulated swirl number against the lifting amount of the intake valve 2. Within the data range (small figures) shown in FIGS. 14 and 15, the swirl number can be freely controlled as keeping the intake air of the engine at a target value.

Figure 16:
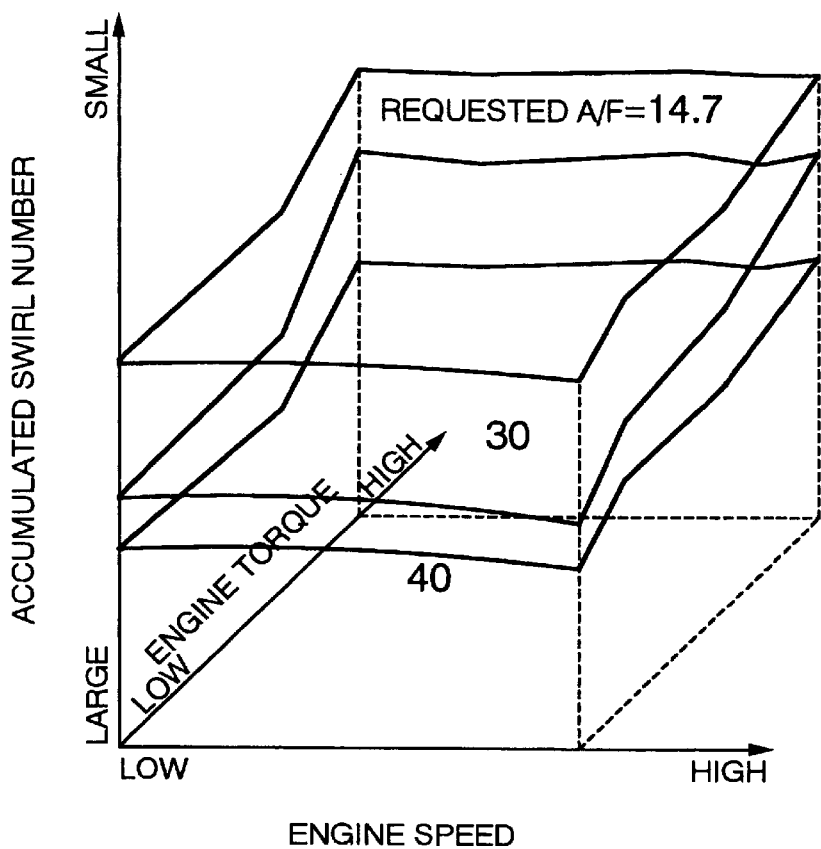
FIG. 16 is a chart showing relational characteristic among an engine speed, an engine torque, and an accumulated swirl number in different requested A/F values.

FIG. 16 is an image view for three-dimensionally showing the foregoing description. It is indicated that the most approximate value of the accumulated swirl number exists for obtaining the requested A/F in the given engine speed number and the engine output torque. Hence, for making the value of (the accumulated swirl number)×(intake air) the optimum by operating the intake valve, the valve control may be executed as relating the intake valve opening time with the valve lifting.

Figure 18:
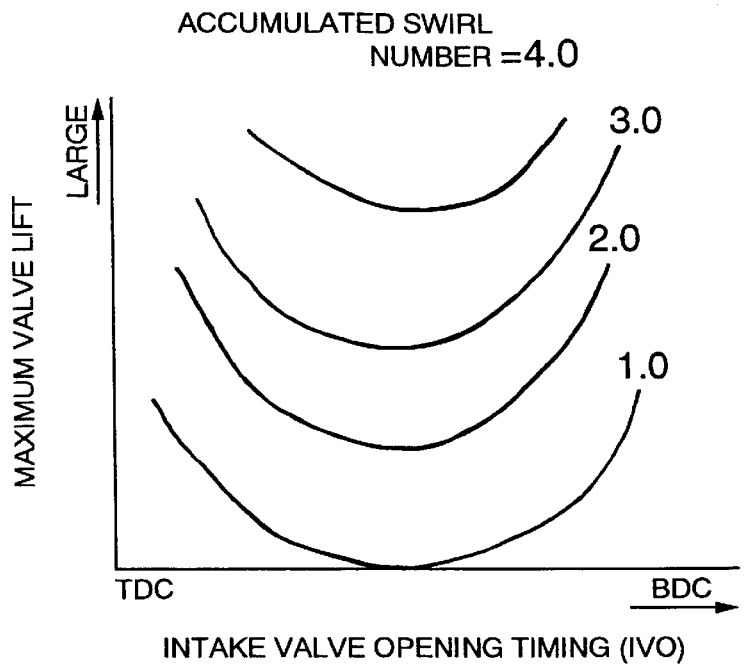
FIG. 18 is a chart showing relation between a maximum valve lift and an intake valve opening timing.

The valve opening and closing control value for obtaining the target accumulated swirl number may be determined from the characteristic as shown in FIG. 18. As will be understood from FIG. 18, as the maximum valve lifting amount is made larger, a larger accumulated swirl number may be obtained. As the valve opening timing of the intake valve comes closer to the middle position between the TDC and the BDC where the piston speed is fast, a larger accumulated swirl number can be obtained.

Figure 17:
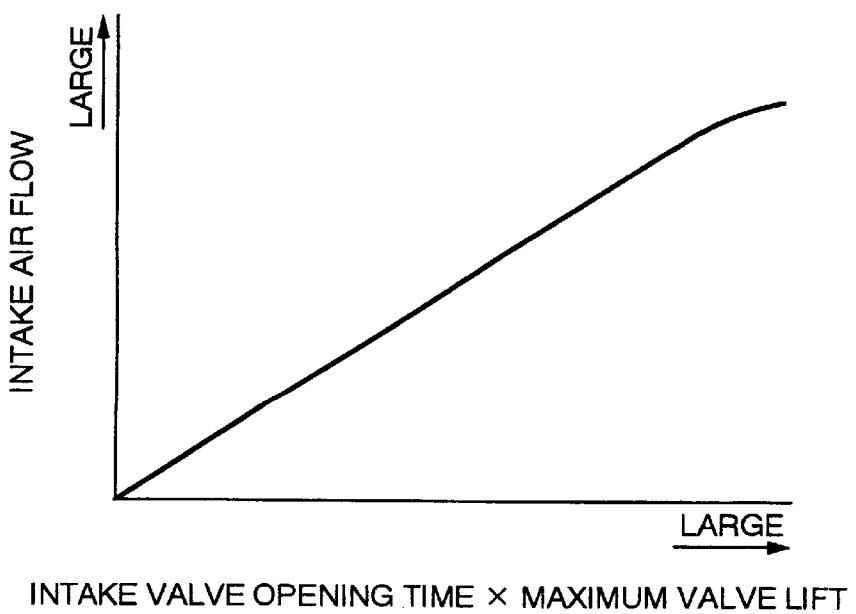
FIG. 17 is a chart showing relation between an intake valve opening timing and an intake valve opening time× maximum valve lift.

On the other hand, as described above with reference to FIG. 8, the air flow sucked into the cylinder is roughly in proportional to a product of a valve opening time of the intake valve and a maximum valve lifting amount as shown by the characteristic of FIG. 17. By determining the desired accumulated swirl number and the intake air flow required for driving at the target A/F, therefore, it is possible to determine the valve opening timing, the valve opening time and the maximum valve lifting amount of the intake valve.

The data on the control characteristics shown in FIGS. 16 to 18 are measured in advance by the experiments and are stored in a memory unit (not shown) contained as a data map in the control unit 17. The target electromagnetic valve opening and closing timing operating unit 46 (see FIG. 4)

serves to read out the control values (the valve opening timing, the valve opening time, and the maximum valve lifting amount) from the data map stored in memory according to the input parameters or process the read data for determining the control values thereon.

Figure 19:
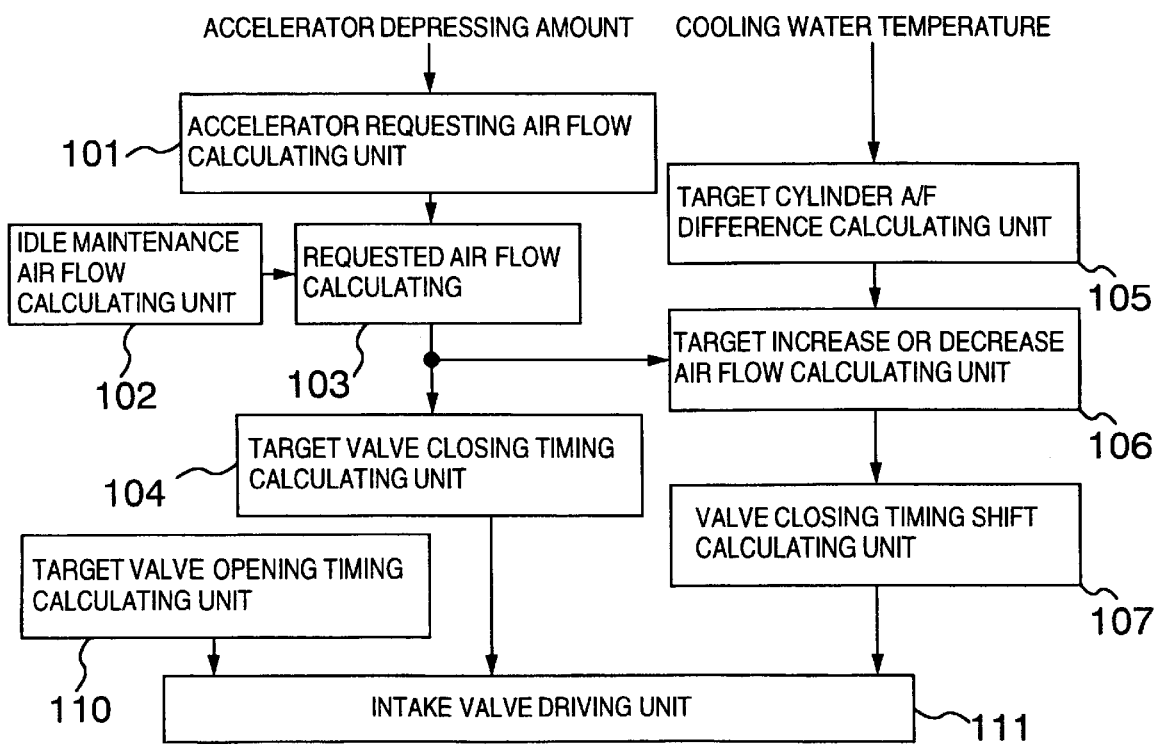
FIG. 19 is a block diagram showing a control process for an intake valve and fuel injection of an engine control device provided with electromagnetic driven intake and exhaust valves.
Figure 20:
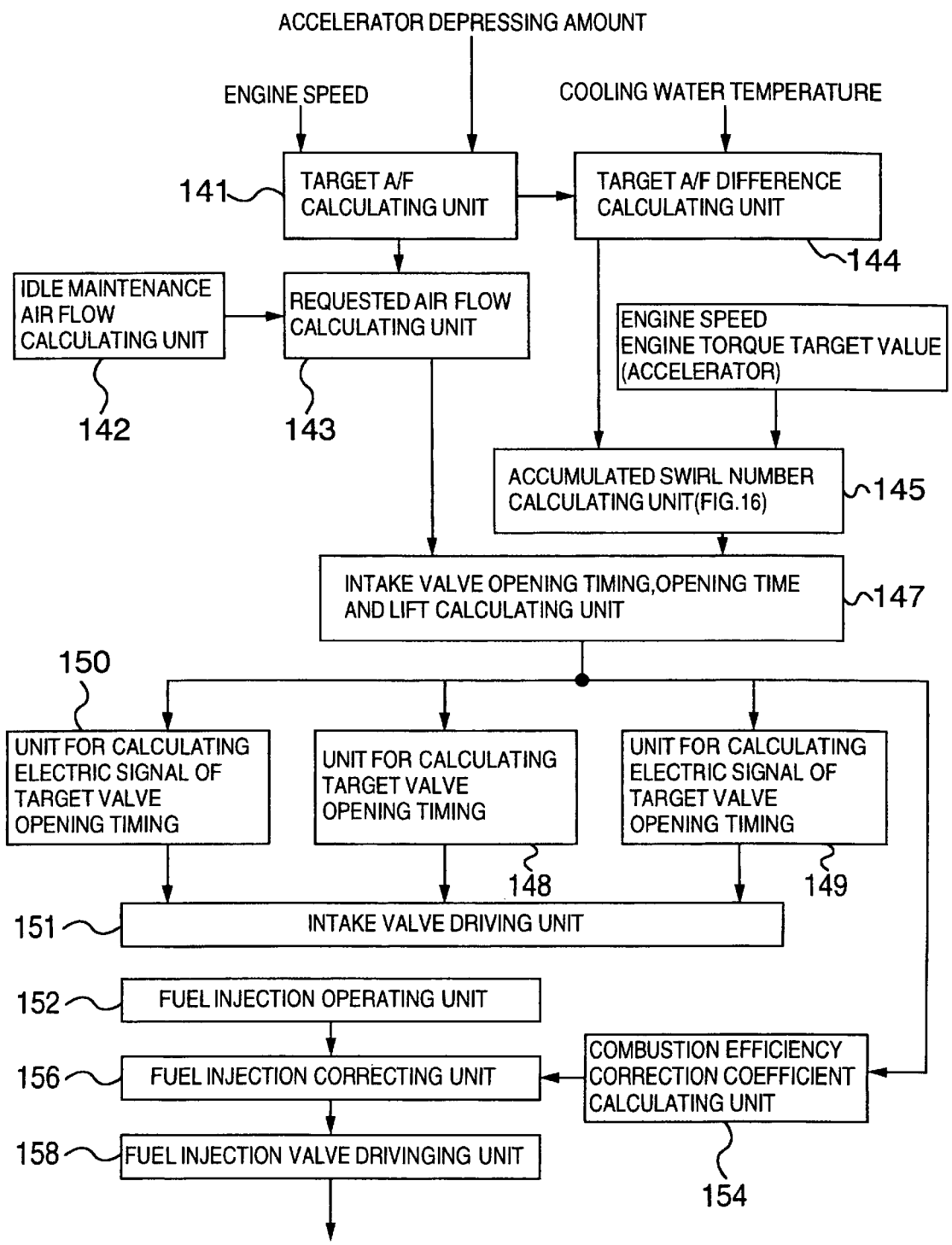
FIG. 20 is a block diagram showing a control process for an intake valve and fuel injection of an engine control device provided with the electromagnetic driven intake valves shown in FIG. 1.
Figure 21:
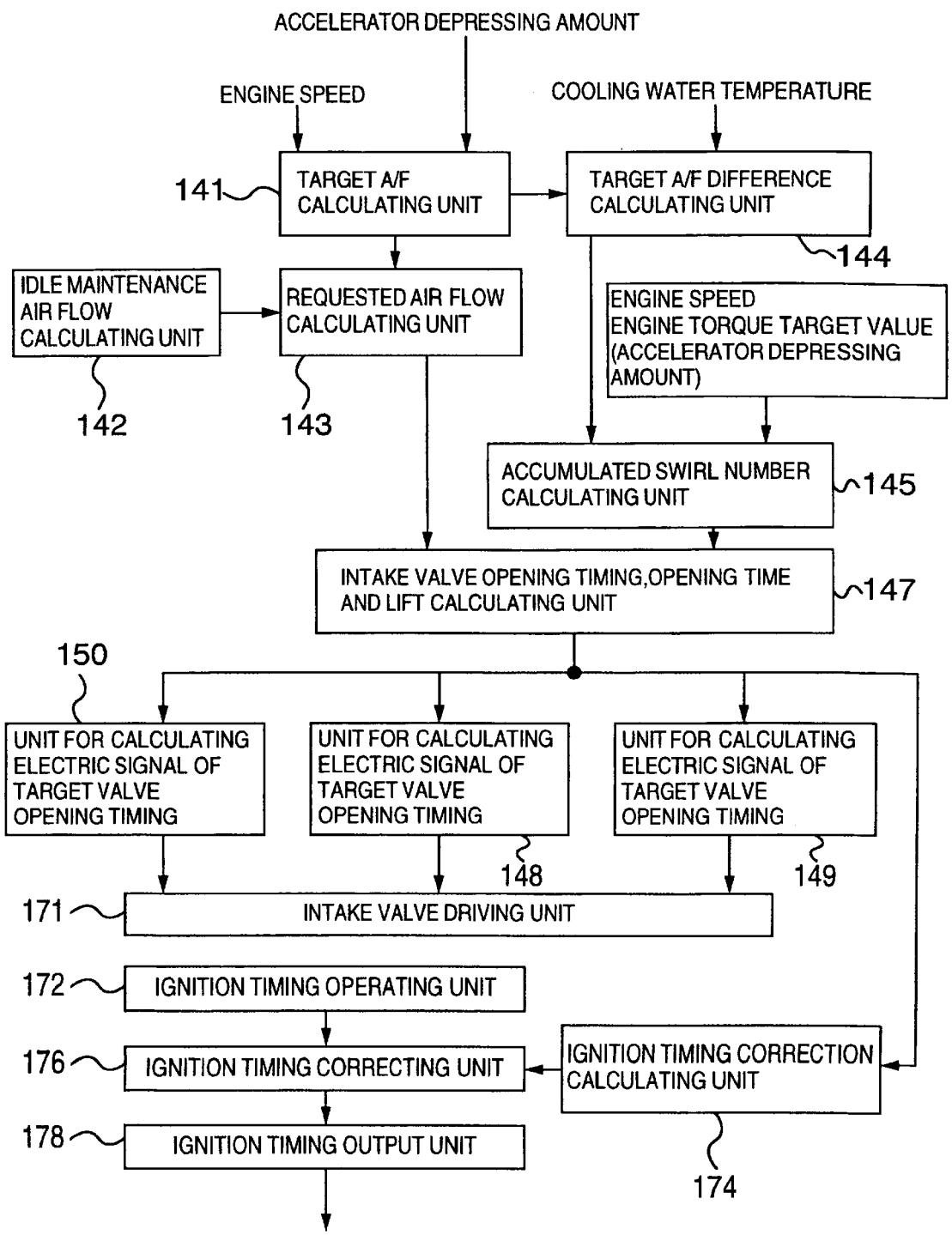
FIG. 21 is a block diagram showing a control process for an intake valve and ignition timing by an engine control device provided with the electromagnetic driven intake valves shown in FIG. 1.

In turn, the description will be oriented to the control flow of the engine control unit provided with the electromagnetic driven intake valve according to this embodiment with reference to FIGS. 19 to 21.

FIG. 19 shows the flow of operations for deriving a command value for driving the intake valve. It is intended for a comparatively simple method. The control block shown in FIG. 19 is executed in the control unit of the engine provided with the electromagnetic driven intake valves structured as shown in FIG. 2. The block diagram of FIG. 19 is described in detail in the copending patent application Ser. No. 09/335767 filed on Jun. 19, 1999.

An accelerator-requesting air flow calculating unit 101 serves to calculate the requested air flow for obtaining the engine output corresponding to a depressing amount. The depressing amount means the engine output the driver requests. In general, in the case of supplying the similar output characteristic to the conventional system having the accelerator pedal and the throttle valve mechanically connected thereto, the concrete calculation is executed to retrieve the table on the data of the accelerator depressing amount against the requested air flow because the relation between the accelerator depressing amount and the requested air flow is nonlinear.

On the other hand, an idle maintenance air flow calculating unit 102 serves to calculate the requested air flow from the request for the engine output in idling operation that is independent of the accelerator operation. As the representative example, it is the idle maintenance. The idle maintenance includes an output requested for keeping the engine speed a target value in an idle state by overcoming the friction torque of the engine, a load of an air-conditioner or a generator powered by the engine, and a load of an oil pump provided in a power steering. In addition, it may be a value requested by a constant speed running unit or a value requested by a traction control unit as a negative output request.

A requested air flow calculating unit 103 serves to add the requested air flow value given by the accelerator requesting air flow calculating unit 101 and the requested air flow value given by the idle maintenance air flow calculating unit 102 for calculating a total requested air flow. A target valve closing timing calculating unit 104 serves to calculate the target valve opening timing of the intake valve based on the total requested air flow.

Immediately after the cold start of the engine, a special cold target A/F at the start is pre-set for activating (raising the temperature of) the catalytic converter. Then, a difference between the supply mixture of each cylinder and the target A/F for a cold start is determined according to the actual cooling water temperature. A difference between the regular A/F of the cylinder and the special target A/F for a cold start is called a target A/F difference of each cylinder. The relation between the cooling water temperature and the target A/F difference of each cylinder is stored in a data map format in the memory unit (not shown).

A target cylinder A/F difference calculating unit 105 serves to calculate a target A/F difference of each cylinder for achieving the early activating effect of the catalytic converter from the cooling water temperature of the engine. The catalytic converter shows a complicated characteristic based on its chemical performance. In general, hence, the concrete calculating method is executed to retrieve the values set in the table based on the cooling water temperature.

A target increase or decrease air flow calculating unit 106 serves to calculate an increase or decrease of the requested air flow based on the target A/F difference of each cylinder. A valve closing timing shift calculating unit 107 serves to calculate a shift (changed value) of the valve closing timing of the intake valve based on the increase or decrease air flow.

In the condition of a constant supply fuel, the change of the A/F is obtained from a ratio of a change of a supply air flow to the original air flow. Hence, by multiplying the ratio of the A/F difference to the reference A/F by the requested air flow, the supply air flow difference can be obtained. An intake valve driving unit 111 serves to drive the intake valve based on the valve opening timing of the intake valve calculated by the target valve opening timing calculating unit 110 and the valve closing timing of the intake valve calculated by the target valve closing timing calculating unit 104.

Further, the target valve opening timing calculated by the target valve opening timing calculating unit 110 comes closer to the TDC of the intake in the case of the simple physical phenomenon described with reference to FIG. 5. The inertial charging effect is one of the factors for determining the intake efficiency of the engine. This inertia charging effect is influenced by the valve opening timing of the intake valve. Further, in the case of implementing the internal EGR (Exhaust Gas Recirculation) of the engine, the valve opening timing of the intake valve also has an influence on the addition. Hence, it is necessary to control the valve opening timing of the intake valve according to the target driving condition of the engine. A target valve opening timing calculating unit 110 serves to determine the target valve opening timing of the intake valve based on those conditions.

FIG. 20 is a block diagram showing a control flow of the electromagnetic driven intake valve according to an embodiment of the invention. The arrangement shown in the block diagram of FIG. 20 is included in the target air flow operating unit 44 and the target electromagnetic valve opening and closing timing operating unit 46 shown in FIG. 4. In this embodiment, the accumulated swirl number is determined on the target A/F. The valve opening timing, the valve opening time, and the maximum valve lifting amount are determined on the accumulated swirl number. Further, a basic fuel injection is corrected according to the determined valve opening timing, the valve opening time and the maximum valve lifting amount.

In the control block shown in FIG. 20, a target A/F calculating unit 141 serves to calculate a basic target A/F according to the engine driving condition determined by the engine speed and the accelerator depressing amount. On the other hand, an idle maintenance air flow calculating unit 142 serves to calculate the necessary air flow from the request for the engine output that is independent of the accelerator. As the representative example, it is the idle maintenance. The idle maintenance includes an output requested for keeping the engine speed a target value in an idle state by overcoming the friction torque of the engine, a load of an air-conditioner or a generator powered by the engine, and a load of an oil pump driving a power steering. In addition, it may be a value requested by a constant speed running unit or a value requested by a traction control unit as a negative output request.

A requested air flow calculating unit 143 serves to calculate the air flow to be sucked into the cylinder of the engine from the target A/F and add the air flow for the idle maintenance and the like calculated by the idle maintenance air flow calculating unit 142 to the calculated air flow. An accumulated swirl number calculating unit 145 serves to determine the accumulated swirl number according to the characteristic shown in FIG. 16 from the calculated result of the unit 144 and the other driving condition (engine speed or the like). As to the calculated result of the unit 144, the correction for the engine cooling water temperature is done therefor.

A valve opening timing, valve opening time and lift calculating unit 147 serves to determine the valve opening timing, the valve opening time (or the predetermined crank angle) and the valve opening lift of the intake valve based on the accumulated swirl number and the requested air flow according to the data map representing characteristics shown in FIGS. 17 and 18. Based on the calculated result, the control blocks 148 to 150 serve to calculate an electric signal for outputting the valve opening time, the valve opening lifting amount and the valve opening timing of the intake valve. An intake valve driving unit 151 serves to operate the intake valve 2 based on the calculated electric signal.

On the other hand, about the calculation of the fuel amount, a fuel injection operating unit 152 serves to operate a basic fuel amount based on the value derived by correcting the target A/F calculated by the target A/F calculating unit 141 through the target A/F difference calculating unit 144. A combustion efficiency correction coefficient calculating unit 154 serves to calculate a correction coefficient based on the valve opening timing, the valve opening time (or the predetermined crank angle) and the valve opening lift of the intake valve calculated by the control block 147. The correction coefficient is a special correction item given in consideration of the influence on the combustion stability of the engine in association with the operation of the intake valve. A fuel injection correcting unit 156 serves to correct the basic fuel amount with the correction coefficient. A fuel injector driving unit 158 serves to drive the fuel injector for injecting the fuel.

FIG. 21 is a control block diagram about the calculation of the ignition timing. The control blocks 141 to 151 shown in FIG. 21 are the same as the control blocks 141 to 151 shown in FIG. 20 except the following difference.

An ignition timing operating unit 172 serves to operate a basic ignition timing based on a detection signal of a crank angle sensor 18 of the engine 1. An ignition timing correction calculating unit 174 serves to calculate an ignition timing correction based on the valve opening timing of the intake valve 2, the valve opening time (or the predetermined crank angle) and the valve opening lift calculated by the control block 167. The correction is a special correcting item given in consideration of the influence on the combustion stability of the engine in association with the operation of the intake valve. An ignition timing correcting unit serves to correct the basic ignition timing calculated by the ignition timing operating unit 172 with the ignition timing correction calculated by the ignition timing correction calculating unit 174 for calculating a corrected ignition timing. An ignition timing output unit 178 serves to supply an output to an ignition plug 16 based on the corrected ignition timing.

The correction for the basic fuel injection implemented by the combustion efficiency correction coefficient calculating unit 154 shown in FIG. 20 and the correction for the basic ignition timing implemented by the ignition timing correction coefficient calculating unit 174 shown in FIG. 21 are executed on the following ground. If the valve opening timing, the valve opening time and the maximum valve lifting amount for meeting with the requested accumulated swirl number and the target intake air flow have the corresponding optimal values, the second optimal values are used for those control values of the intake valve, so that the fuel flow or the ignition timing are corrected for setting the A/F to the most approximate value for securing the combustion as keeping the target intake air flow for meeting the requested output. For example, though the accumulated swirl number is not the requested optimal value, the intake air flow is regulated as a target value and the correction value is determined so that the A/F is made to be the most lean value in the range of keeping the combustion. Then, the basic fuel injection is modified on this correction value. Or, the accumulated swirl number is set to the requested optimal value, the intake air flow is set to a value out of the target value, and the lower value of the output caused by the value out of the target one is recovered by the correction for the ignition timing or the correction for the fuel flow. The optimal one of the correcting characteristics for the fuel or the ignition timing may be selected according to the engine performance or the requested characteristics of the exhaust emissions or the fuel economy.

In the embodiment of this invention described above, the valve opening timing, the valve opening time and the maximum valve lifting amount of the intake valve are controlled at a time. In place, one or two of those values may be selectively controlled. Further, not only the intake valve but the exhaust valve may take the electromagnetic driven type and be optimally controlled to be opened or closed. It goes without saying that the present invention may apply to the engine constructed to inject the fuel to the intake port as well as the engine constructed to directly inject the fuel to the cylinder.

The foregoing description has concerned with one embodiment of the present invention. However, the present invention is not limited to the foregoing embodiments but may be modified in various forms without having to depart from the spirit of the invention set forth in the claims.

As is understood from the above description, the engine control device provided with the electromagnetic driven intake valves of the present invention serves to calculate the valve opening and closing timing, the valve opening time and the valve opening lifting amount of the intake valve based on the target A/F and the requested intake air flow calculated according to the driving condition of the engine and operate the intake valve based on those calculated values. Hence, the engine control device is capable of properly adjusting the intake air flow sucked into the engine cylinder and the strength of the circulation such as swirl or tumble of the flown air. As a result, the control for the A/F of the engine is executed so that the request for a super lean A/F combustion of the engine may be achieved at a stable combustion performance without having to cause a undesired fluctuation of engine revolution and surging of engine.

What is claimed is:

1. A control device for an engine provided with an electromagnetic actuator for controlling an opening and closing operation of an intake valve in response to an electric driving signal, comprising:

means for determining a target A/F based on a signal corresponding to a requested engine output value and a signal for representing a driving condition of said engine;

means for determining a requested intake air flow of a cylinder of said engine on the basis of said signal for representing the driving condition of said engine and said target A/F; and control means for determining control values about the opening and closing operation of said intake valve on the basis of said requested intake air flow and said target A/F, said control values including at least one of a valve opening timing, a valve opening time and a maximum valve lifting amount of said intake valve, and generating said electric driving signal corresponding to said control values, wherein said engine is configured to generate a whirl of intake air into said cylinder, and said control means includes means for determining a value for indicating a strength of a whirl of the intake air required for obtaining said target A/F and means for determining said valve control values containing at least one of the valve opening timing, the valve opening time and the maximum valve lifting amount of said intake valve according to the value for indicating the strength of said whirl.

2. A control device as claimed in claim 1, further comprising means for modifying a basic fuel injection amount according to at least one of the valve opening timing, the valve opening time and the maximum valve lifting amount of said intake valve.

3. A control device as claimed in claim 1, further comprising means for modifying a reference ignition timing according to at least one of the valve opening timing, the valve opening time and the maximum valve lifting amount of said intake valve.

4. A control device as claimed in claim 1, wherein said means for determining said target A/F includes means for determining a requested engine torque based on an accelerator depressing amount of a car having said engine mounted therein and means for determining said target A/F based on said requested engine torque, and said means for determining said valve control values includes means for determining a value for indicating a strength of said whirl according to said requested engine torque value and an engine speed.

5. A control device as claimed in claim 4, wherein said means for determining said control values includes means for determining said valve opening timing, said valve opening time and said maximum valve lifting amount on the basis of said value for indicating the strength of said whirl and said requested intake air.

6. A control device as claimed in claim 5, wherein said means for determining said control values includes a memory for storing a data map for indicating relation among the engine torque value, the engine speed, the valve opening timing, the valve opening time and the maximum valve lifting amount.

7. A control device as claimed in claim 6, wherein said whirl of the intake air is at least one of swirl and tumble generated inside of the cylinder of said engine.

8. A control device as claimed in claim 7, wherein the value for indicating the strength of said whirl is represented by a rotation angle per unit time of a swirl flow or a tumble flow of the intake air generated inside of said cylinder.

9. A control device as claimed in claim 1, wherein said engine is mounted in a car which includes means for generating a signal for indicating an accelerator depressing amount and a catalytic converter, said means for determining said target A/F includes means for determining a basic A/F based on said signal for indicating the accelerator depressing amount and a signal for indicating an engine speed and means for determining said target A/F by correcting said basic A/F according to the predetermined A/F proper to said cylinder, said A/F being concerned with the rise of a temperature of said catalytic converter.

10. A computer usable medium having computer readable program code means embodied in said medium for a control method for an engine provided with an electromagnetic actuator for controlling an opening and closing operation of an intake valve according to an electric driving signal, said computer readable program code means comprising:

a process of determining a target A/F on the basis of a signal corresponding to a requested engine output value and a signal for representing a driving condition of said engine;

a process for determining a requested intake air flow of a cylinder of said engine on the basis of the signal for representing the driving condition of said engine and said target A/F; and a process of determining control values about an opening and closing operation of an intake valve based on said requested intake air flow and said target A/F, said control values including at least one of a valve opening timing, a valve opening time and a maximum valve lifting amount of said intake valve, and generating said electric driving signal according to said control values wherein said process of determining said target A/F includes a process of determining a requested engine torque based on an accelerator depressing amount of a car having said engine mounted therein and a process of determining said target A/F based on said requested engine torque, and said process of determining said valve control values includes a process of determining a value for indicating a strength of a whirl according to said requested engine torque value and an engine speed.

11. A computer usable medium as claimed in claim 10, wherein said process of determining said valve control values includes a process of determining said valve opening timing, said valve opening time and said maximum valve lifting amount based on a value for indicating the strength of said whirl and the requested intake air flow.

12. A computer usable medium as claimed in claim 11, wherein a process of determining said valve control values includes a process of determining said valve opening timing, said valve opening time and said maximum valve lifting amount by retrieving a data map for indicating relation among said engine torque value, said engine speed, said valve opening timing, said valve opening time and said maximum valve lifting amount.

* * * * *